Nov. 13, 1928.
B. J. J. KERR
WAGON SEAT
1,691,157
Filed Oct. 28, 1926
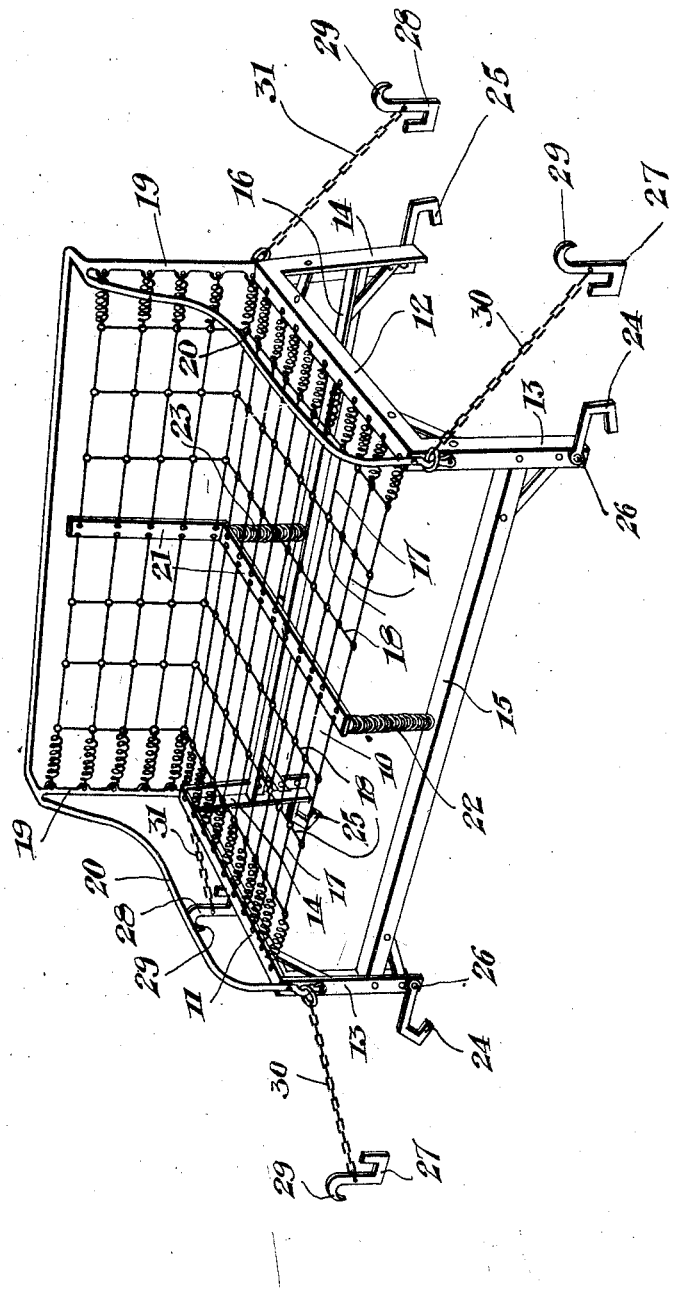
INVENTOR.
BARRON. J. J. KERR.
BY Fetherstonhaugh & Co.
ATT'YS.

Patented Nov. 13, 1928.

1,691,157

UNITED STATES PATENT OFFICE.

BARRON JAMES JOSEPH KERR, OF WIMBORNE, ALBERTA, CANADA.

WAGON SEAT.

Application filed October 28, 1926. Serial No. 144,844.

This invention relates to improvements in wagon seats and the objects of the invention are to provide a simply constructed durable seat vertically adjustable for wagons and the like.

A further object is to provide a seat that can be raised or lowered quickly into the box of a wagon to protect the occupant from the elements in inclement weather and in fine weather to enable the occupant to enjoy it.

The invention consists in the combination with the box of a wagon of a spring seat adapted to detachably engage with the top of the box in normal raised position and to be lowered and suspended within the box by adjustable connections detachably engaging with supports on the outside of the box.

In the drawing in which like characters of reference indicate corresponding parts, is is shown in perspective view of my improved seat.

The figure is a perspective view of my improved seat.

Referring now to the drawing 10 designates the body of a seat of substantially rectangular formation formed with end pieces of angle-iron 11 and 12, having integral therewith the legs 13 and 14, while 15 and 16 are longitudinally extending braces for the legs. Connecting the end pieces 11 and 12 is a seat comprising a plurality of wires 17 coil wound adjacent each end to impart a spring to the seat, these wires being crossed at spaced intervals by the transversely extending wires 18. On the body 10 is secured the back frame 19 also of metal and secured to the body in any well known manner and provided with side arms 20. The frame is also of wire similar to the seat. In the centre of the seat is a plate 21 between which and the braces 15 and 16 are coil wound springs 22 and 23. The legs 13 and 14 are provided with clamping members 24 and 25 pivotally mounted thereon at 26 and designed to engage with the top of a grain box or vehicle body to support the seat on the body.

For enabling the seat to be lowered within the body to protect the occupant from the inclemency of the weather I provide suspending clamping members 27 and 28 adapted to detachably engage with the top of the box and to extend downwardly therefrom, the ends of these members being hooked as at 29 to engage individually with the different links in the suspending chains 30 and 31 connecting the suspension members in any well known manner at both ends with the body of the seat at the back and the front.

It will thus be seen that the spring seat can be, through the members 24 and 25 pivotally connected to the extremities of the legs, readily attached to the top of a vehicle body and when it is desired to drop the seat within the shelter of the body of the wagon the members 24 and 25 are swung out of engagement and the seat allowed to move out to the length of the suspension chains 30 and 31 connected to the seat and to the suspension members 27 and 28 in engagement with the top of the box.

As many changes could be made in the above construction and many apparently widely different embodiments of my invention within the scope of the claim, constructed without departing from the spirit or scope thereof, it is intended that all matter contained in the accompanying specification and drawings shall be interpreted as illustrative and not in a limiting sense.

What I claim as my invention is:

A wagon seat comprising a body of rigid angle bars, longitudinally extending reinforcing bars connecting the angle bars, a back frame for the body, and side arms integral with said frame and connected to the angle bars, a plurality of longitudinally extending spaced wires spring-connected at each end to the body portion and the back frame, a plurality of spaced cross wires connected to the aforementioned wires, a central reinforcing plate for the body portion and the back engaging the longitudinally extending wires, coil spring supports between said plate and the reinforcing bars for the angle bars, suspending clamping members for the seat, and flexible members connecting the clamping members with the angle bars.

In witness whereof I have hereunto set my hand.

BARRON JAMES JOSEPH KERR.